US009378508B2

(12) United States Patent
Burnette et al.

(10) Patent No.: US 9,378,508 B2
(45) Date of Patent: Jun. 28, 2016

(54) SYSTEM AND METHOD FOR CONTENT PRE-POSITIONING DETERMINATION

(71) Applicant: Opanga Networks, Inc., Seattle, WA (US)

(72) Inventors: John M. Burnette, Seattle, WA (US); Nathan Clark, Seattle, WA (US); Jeffrey P. Harrang, Sammamish, WA (US); David B. Gibbons, Redmond, WA (US)

(73) Assignee: OPANGA NETWORKS, INC., Seattle, WA (US)

( * ) Notice: Subject to any disclaimer, the term of this patent is extended or adjusted under 35 U.S.C. 154(b) by 171 days.

(21) Appl. No.: 13/667,827

(22) Filed: Nov. 2, 2012

(65) Prior Publication Data

US 2013/0117349 A1 May 9, 2013

Related U.S. Application Data (60) Provisional application No. 61/555,949, filed on Nov. 4, 2011.

(51) Int. Cl.
  *G06F 15/173* (2006.01)
  *G06Q 30/02* (2012.01)
  (Continued)

(52) U.S. Cl.
  CPC ........ *G06Q 30/0201* (2013.01); *G06Q 30/0202* (2013.01); *G06F 17/30864* (2013.01); *H04L 65/4084* (2013.01)

(58) Field of Classification Search
  CPC ............... G06F 17/30864; G06F 17/30017; G06F 17/30902; H04L 65/4084; G06Q 30/0201; G06Q 30/0202; H04N 21/4532; H04N 21/466

USPC .................. 707/751, 722, 319; 709/223, 238; 726/26
See application file for complete search history.

(56) References Cited

U.S. PATENT DOCUMENTS 7,490,136 B2 *  2/2009  Suzuki ................... G06F 21/10
                                                            705/51
7,548,948 B2 *  6/2009  Klemets .................. H04N 5/76
                                                            709/203

(Continued)

FOREIGN PATENT DOCUMENTS

JP      2002-540684 A    11/2002
KR   10-2010-0028803 A    3/2010

OTHER PUBLICATIONS

Web Content Serving UtilityIBM Systems Journal, vol. 43, No. 1, 2004.*

(Continued)

*Primary Examiner* — Viet Vu
*Assistant Examiner* — Michael A Chambers (57) ABSTRACT

Systems and methods for determining or "predicting" which media content files are popular or will be popular, and based on that determination, pre-delivering or "pre-positioning" media content files to user devices automatically and without intervention from users so that the media content will be already stored on users' devices when they later select the media content for viewing. The determination of a media content file's popularity may be based on one or more combinations of content statistics (e.g., view count, viewing rate, etc.). The decision to pre-position a media content file may also be based on user profile information (e.g., viewing history). The pre-positioning may be accomplished using transport technology that avoids further burdening the network, such as delivering in real-time using available surplus network capacity.

36 Claims, 6 Drawing Sheets

(51) Int. Cl.
*H04L 29/06* (2006.01)
*G06F 17/30* (2006.01)

(56) References Cited

U.S. PATENT DOCUMENTS

| | | | | |
|---|---|---|---|---|
| 7,827,170 | B1* | 11/2010 | Horling | G06F 17/3053 707/722 |
| 8,145,528 | B2* | 3/2012 | Gilley | G06Q 30/0241 705/14.4 |
| 8,209,333 | B2* | 6/2012 | Hubbard | G06Q 30/02 705/14.52 |
| 8,676,875 | B1* | 3/2014 | Smith | H04L 51/32 705/37 |
| 8,856,146 | B2* | 10/2014 | Dempski | G06F 17/30864 705/319 |
| 8,959,341 | B2* | 2/2015 | Dismore | G06F 17/30893 713/168 |
| 9,058,332 | B1* | 6/2015 | Darby | G06F 17/3005 |
| 2006/0167956 | A1* | 7/2006 | Chasen | G06F 17/30902 |
| 2008/0154889 | A1* | 6/2008 | Pfeiffer | G06F 17/3084 |
| 2009/0060468 | A1* | 3/2009 | Carlberg | H04N 7/17318 386/297 |
| 2010/0262635 | A1* | 10/2010 | Hambleton | G06Q 30/0222 707/812 |
| 2010/0306249 | A1* | 12/2010 | Hill | G06F 17/30867 707/769 |
| 2011/0078003 | A1* | 3/2011 | Steelberg | G06Q 30/02 705/14.4 |
| 2011/0106847 | A1* | 5/2011 | Bocharov | H04L 65/602 707/770 |
| 2011/0184806 | A1* | 7/2011 | Chen | G06K 9/6226 705/14.52 |
| 2012/0117059 | A1* | 5/2012 | Bailey | G06F 17/30867 707/723 |
| 2013/0204664 | A1* | 8/2013 | Romagnolo | G06Q 30/0203 705/7.32 |
| 2014/0280213 | A1* | 9/2014 | Isquith | G06Q 30/0202 707/748 |
| 2014/0304724 | A1* | 10/2014 | Shin | H04N 21/442 725/10 |
| 2015/0135337 | A1* | 5/2015 | Fushman | H04L 67/22 726/30 |

OTHER PUBLICATIONS

International Search Report and Written Opinion for PCT Patent Application No. PCT/US2012/063399 mailed Mar. 27, 2013.

* cited by examiner

SYSTEM AND METHOD FOR CONTENT PRE-POSITIONING DETERMINATION

BACKGROUND OF THE INVENTION

1. Field of the Invention

The present disclosure is directed generally to network service providers and, more particularly, to systems and methods for delivering media content to client computing devices.

2. Description of the Related Art

Streaming online content while connected to a network is a popular method of delivering requested media content from networked servers for consumption by a requestor. A familiar problem with streaming online content is that the network connecting the server and a receiver may have transient fluctuations in its ability to deliver the content, resulting in interruptions in the playback (or "playout") session. Various methods have been proposed to mitigate this issue including content compression to reduce the delivery rate, dynamic real-time encoding to reduce the delivery rate/playback-quality to match the network capability, and pre-buffering a short segment of the content before allowing playback to start and thereafter filling the buffer faster than the content can be played out until the end of the playback session. This last streaming method has become known as progressive download (or "PD"), and the technique is intended to build up a safety margin in order to be able to maintain continuous playback during brief intervals when the server is unable to maintain the delivery rate to the receiver over the network. However, pre-buffering a short segment of the content before allowing playback to start on a user's device requires the user to wait for the segment to download before playback begins.

While designed to reduce and to avoid interruptions, progressive download is not immune to network impairments that persist long enough to empty a buffer on a system receiving the content. In those cases, the playback session is forced to halt until the buffer can again be re-filled and the session recommences. It is therefore a common experience that existing progressive download techniques often fail to provide a continuous playback session depending on the capabilities of the network.

When distributing audio or video content across networks, pre-delivering content to end user devices provides a better user experience than on-demand deliver (e.g., streaming, progressive download, etc.). Pre-delivery of the content removes the pauses, stuttering, and connection timeouts associated with on-demand delivery. However, conventionally users need to plan ahead when they wish to consume pre-delivered content to allow enough time for the content to be delivered to their devices prior to consumption.

DETAILED DESCRIPTION OF THE INVENTION

Embodiments of the present invention are directed to systems and methods for determining or "predicting" which media content files are popular or will be popular, and based on that determination, pre-delivering or "pre-positioning" media content files to user devices automatically and without intervention from users so that the media content files will be already stored on users' devices when they later select the media content for viewing. Thus, using the systems and methods of the present invention, users will not have to wait for downloading or buffering operations before playback of selected content files begins on their client computing devices because the selected content will have been previously downloaded to the devices in a manner transparent to the users.

For example, consider a service such as YOUTUBE® where many videos are uploaded to a video server each day. Of these videos, most will not receive many views. However, a few videos will become popular, some even going "viral," where they may be viewed a large number of times (e.g., millions of times, etc.). In fact, a majority of the views of YOUTUBE® videos are for a relatively small number of videos. The ability to rapidly determine early in a video's lifecycle that it will "go viral" (i.e., become widely known or popular by virtue of viewer recommendations), and to pre-position it on end user devices is a valuable asset, as discussed below. Generally, embodiments of the present invention provide systems and methods for determining when a digital media file (e.g., video, audio, image, text, etc.) is a good candidate for pre-positioning onto one or more user devices.

As used herein, pre-positioned digital content refers to online content that is delivered (i.e., positioned) in part or in its entirety to a client computing device and stored on a memory thereof for consumption by a user at a later time independent of the time of delivery. This is contrasted with streaming content or progressive download content that is delivered to a client computing device for immediate playback (i.e., "real-time" or "on demand" playback). One example of pre-positioned digital content is a video file that is downloaded and stored on a client computing device, such as a fixed or mobile unit with playback capability, and watched by the user sometime after it has been pre-positioned and stored (e.g., one hour later, one week later, etc.).

In accordance with embodiments of the present invention, media content can be delivered to a client computing device and played instantly thereon at a later time by using a method of pre-positioning. In some embodiments, this is accomplished using transport technology that avoids further burdening the network such as delivery in real-time using available surplus network capacity. This solution takes the burden off the network traffic to pre-position popular media content to client computing devices. Systems and methods for delivery using available surplus network capacity are disclosed in commonly owned U.S. Pat. No. 7,500,010, titled "Adaptive File Delivery System and Method," by Harrang et al., filed Apr. 15, 2010, and U.S. Patent Pub. No. 2009/0164603, titled "Adaptive File Delivery System and Method," by Harrang et al., filed Feb. 27, 2009, each of which are incorporated herein by reference.

Figure 1:
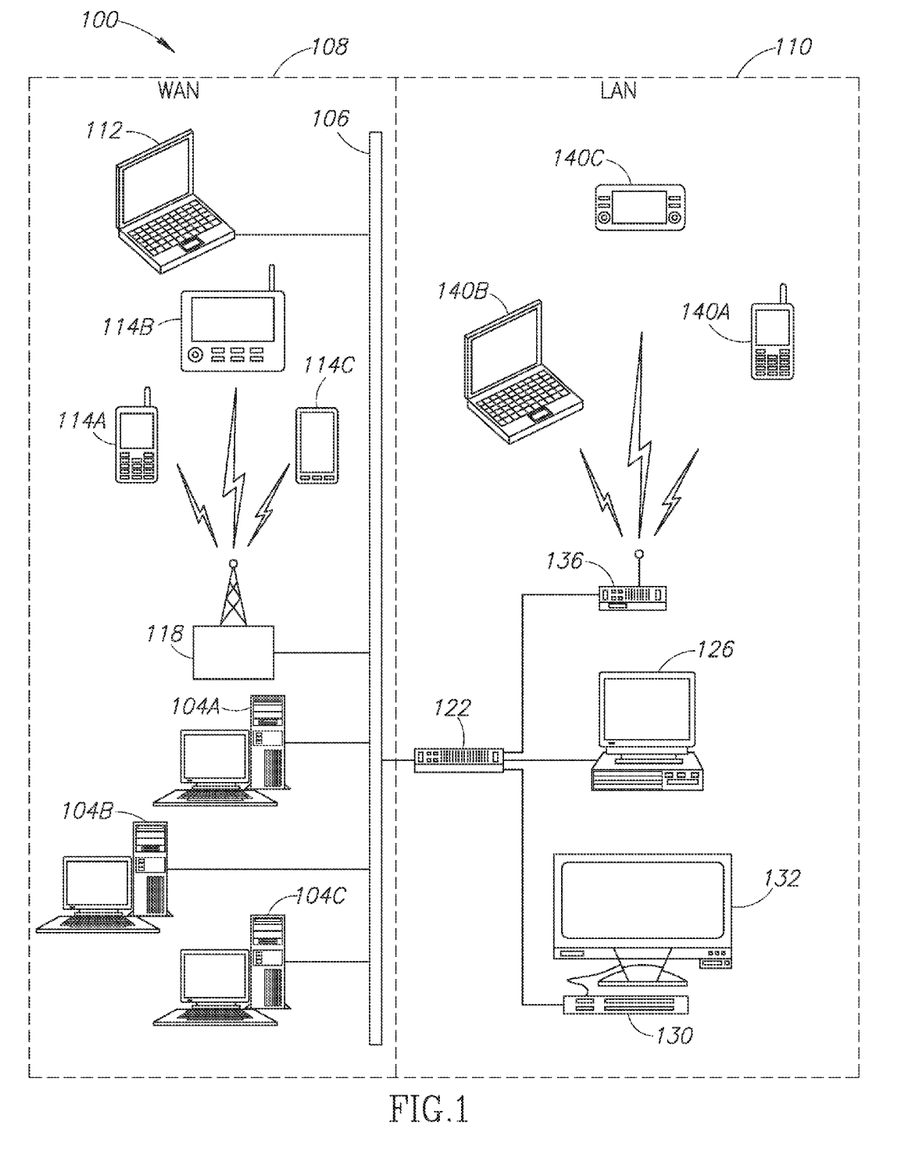
FIG. 1 illustrates an exemplary embodiment of a system architecture constructed in accordance with the present disclosure.

In accordance with an embodiment of the present invention, FIG. 1 illustrates a networked computing system 100 including various wire line and wireless computing devices that may be utilized to implement any of the content delivery processes associated with various embodiments of the present invention. The networked computing system 100 may include, but is not limited to, a group of remote server devices 104A-C, any one of which may be associated with various media content providers (MCP) (see FIG. 3) that can provide media content distribution services to various networked clientele, or various content monitoring servers (CMS) (see FIG. 4) that can facilitate managed pre-positioned delivery of popular media content in accordance with various processes of the present invention. The networked computing system 100 also includes a data communications network 106 (including both wide area network (WAN) 108 (e.g., the Internet) and local area network (LAN) 110 portions), one or more remote client devices 112, and one or more wireless remote client devices 114 (e.g., a cellular phone 114A, an electronic book device 114B, a PDA device 114C, etc.) that may be connected to the data communications network 106 utilizing one or more wireless base stations 118 or any common wireless or wire line network communications technology.

The networked computing system 100 may also include one or more network gateway or switch devices 122 that can facilitate data communications processes within the LAN 110 or between the LAN and the WAN 108 of the data communications network 106. Generally, the gateway or switch device 122 may represent any devices configured to allow other devices to access the data communications network 106 (e.g., service provider gateway, etc.). The network gateway or switch device 122 may facilitate data communications with one or more wired LAN devices, such as a personal computer 126, a multi-media device 130 (e.g., such as a set-top box, digital video recorder (DVR), Blu-Ray® player, and/or a digital video disk (DVD) player/recorder device) for use with a television 132, etc. The networked computing system 100 may further include a wireless router 136 that may communicate with various wireless LAN devices 140 using any common local wireless communications technology, such as Wi-Fi®, etc. Such wireless LAN devices may include, for example, a smartphone device 140A, a wireless computer 140B, and a wireless media playback device 140C (e.g., a personal video player, an e-book device, etc.).

In various embodiments, any of the LAN connected devices 126, 130, and 140A-C or the remote client devices 112 and 114A-C, may include media content management functionality consistent with the processes of the present invention, as discussed below.

The remote server devices 104A-C, the wireless base station 118, the remote client devices 112 and 114A-C, and any of the LAN connected devices 126, 130, and 140A-C, may be configured to run any known operating system. Further, the remote server devices 104A-C and the wireless base station 118 may employ any number of common server, desktop, laptop, and personal computing devices. In an embodiment, the remote client devices 112 and 114A-C and any of the wireless LAN connected devices 140A-C may include any combination of computing devices (e.g., cellular phones, PDAs, eBooks, ultra-portable computers, personal music players, etc.), having wireless communications capabilities utilizing any common cellular data commutations protocol, such as GSM®, UMTS®, Imax®, Wi-Fi®, LTE®, or other protocol.

The WAN 108 of the data communications network 106 may include, but is not limited to, any of the following communications technologies: optical fiber, coaxial cable, twisted pair cable, Ethernet cable, and power line cable, along with any wireless communication technology known in the art. In an embodiment, any of the remote server devices 104A-C, the wireless base station 118, the remote client devices 112 and 114A-C, and any of the LAN connected devices 126, 130, and 140A-C, may include any standard computing software and hardware necessary for processing, storing, and communicating data amongst each other within the networked computing system 100. The computing hardware may include, but is not limited to, one or more processors, volatile and non-volatile memories, user interfaces, transcoders, and wire line and/or wireless communications transceivers.

Any of the LAN connected devices 126, 130, and 140A-C or the remote client devices 112 and 114A-C may be configured to include one or more computer-readable media (e.g., any common volatile or non-volatile memory type) encoded with a set of computer readable instructions which, when executed, perform one or more data transfer and/or media content management functions associated with any of the processes of the present invention.

Figure 2:
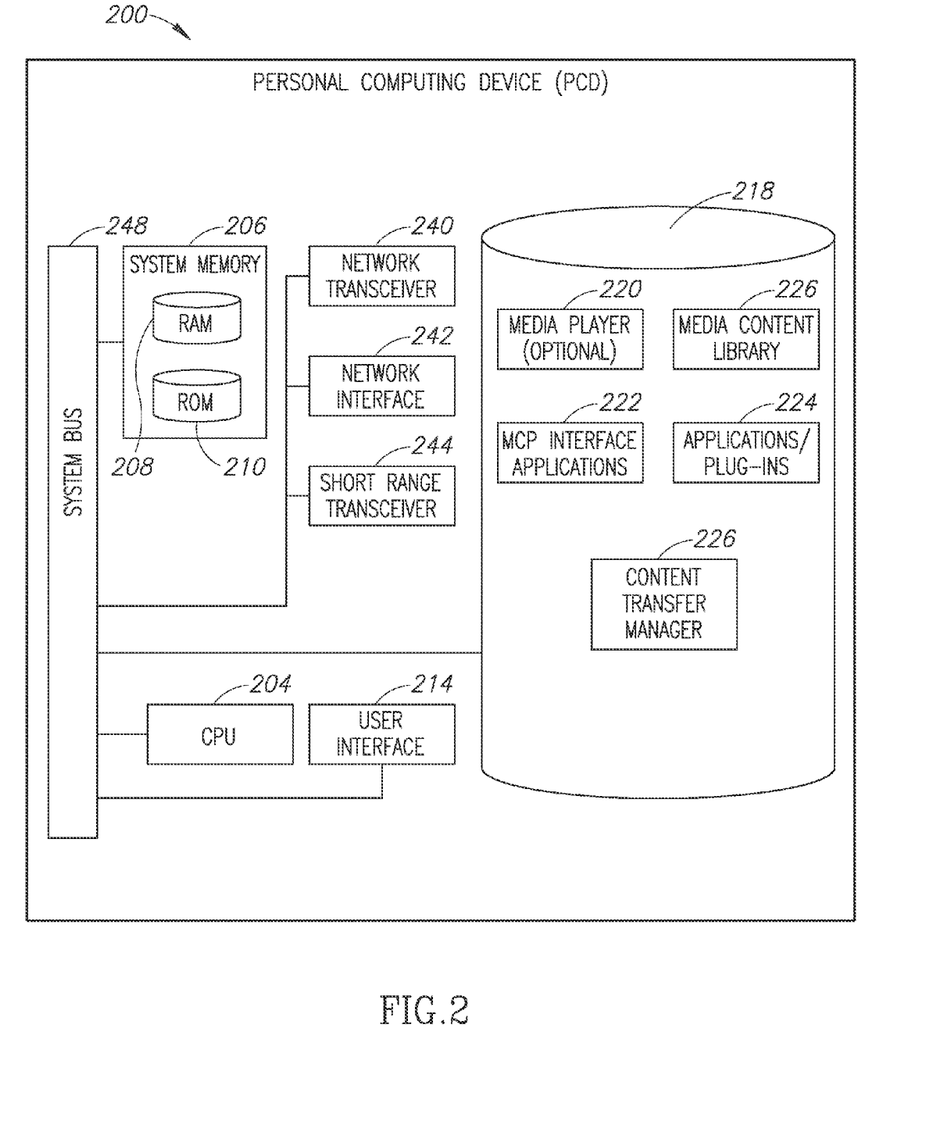
FIG. 2 illustrates a block diagram of a personal computing device (PCD) according to an embodiment.

FIG. 2 shows a block diagram view of a personal computing device (PCD) 200 that may be representative of any of the LAN connected personal computing devices 126, 130, and 140A-C or the remote client devices 112 and 114A-C shown in FIG. 1. The PCD 200 may include, but is not limited to, one or more processor devices including a central processing unit (CPU) 204. The CPU 204 may be responsible for executing computer programs stored on the PCD's 200 system memory 206, which may include volatile (RAM) memory 208 and nonvolatile (ROM) memory 210. The PCD 200 may also include a user interface 214 that allows a user to interact with the PCD's software and hardware resources. The user interface 214 may include various inputs (e.g., keyboard, mouse, touchscreen, microphone, etc.) and outputs (e.g., display, speakers, etc.).

The PCD 200 further includes a system data storage structure 218 that includes an optional media player application 220 that facilitates media content playback on the PCD 200, and MCP interface applications 222 that may be optionally integrated with an MCP website interface to allow a user to select media content for download from or upload to an MCP (e.g., a network location associated with any of remote server devices 104A-C of FIG. 1). In general, the system data storage structure 218 may include applications and/or application plug-ins 224 (e.g., web-browsers, browser plug-ins, email client applications, access provider utilities, etc.) that may facilitate a user of the PCD 200 interacting with various media content providers (MCPs) (see FIG. 3) over the data communications network 106 of FIG. 1.

The system data storage structure 218 may also include a media content library 226 that includes a user's downloaded, or otherwise acquired, digital media content (e.g., digital movies, TV programs, home videos, software applications, video games, music, e-books, etc.). The system data storage structure 218 also includes a content transfer manager 226 that facilitates transfer of media content to and from the PCD 200.

The PCD 200 may also include a network transceiver 240 and a network interface 242 that allow the PCD 200 to communicate across the LAN 110 and WAN 108 portions of the data communications network 106 of FIG. 1. The PCD 200 may also include an optional short-range transceiver 244 (e.g., a Bluetooth® or a Wi-Fi® enabled communications transceiver) that allows the PCD 200 to wirelessly communicate with one or more electronic devices. Further, the PCD 200 may include a system bus 248 that facilitates data communications amongst all the hardware resources of the PCD 200.

Figure 3:
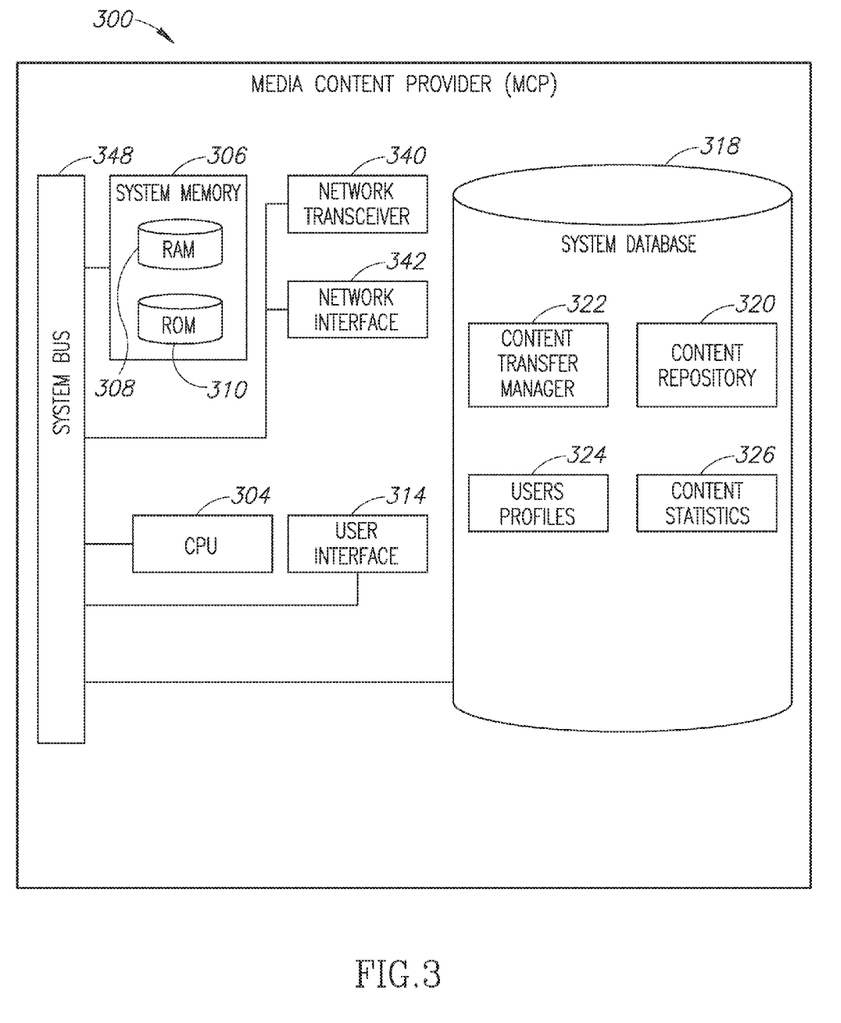
FIG. 3 illustrates a block diagram of a media content provider (MCP) according to an embodiment.

FIG. 3 shows a block diagram view of a media content provider (MCP) 300 that may be representative of any of the remote server devices 104A-C in FIG. 1. The MCP 300 may include, but is not limited to, one or more processor devices including a central processing unit (CPU) 304. The CPU 304 is generally responsible for executing computer programs stored on the MCP's 300 system memory 306, which may include volatile (RAM) memory 308 and nonvolatile (ROM) memory 310. The MCP 300 may also include a user interface 314 that allows a user/administrator to interact with the MCP's software and hardware resources.

The MCP 300 also includes a system database 318 that includes a media content repository 320, as well as a hosted website 323 including various graphical user interface (GUI) components (e.g., static html and dynamic components, such as java-based applications) that may facilitate a user making media content selections for purchase and download. The MCP 300 may also include a network transceiver 340 and a network interface 342 for transmitting and receiving data content (e.g., such as media content to be delivered to a client computing device) over the data communication network 106 of FIG. 1. The MCP 300 may also include a system bus 348 that facilitates data communications amongst the hardware resources of the MCP 300.

The system database 318 of the MCP 300 may also include a media content transfer manager application 322 to facilitate delivery of various media content data files (e.g., movies, TV programs, home video, software applications, video games, music, large volumes of text, etc.) stored in the MCP's 300 media content repository 320 in response to various media content transfer requests. The media content data files may be delivered for consumption on-demand or for consumption at a later time. The media content transfer manager application 322 may also facilitate generation and delivery of various media content properties/characteristics, such as a particular media content's file size, length, type, location of content source, number of network hops to content sources, content source network address, user authentication and/or authorization credentials, or available transfer protocol (e.g., ftp, http, https, smtp, pop3, imap, p2p, etc.).

The system database 318 may also include a media content statistics repository 326 that includes various media content statistics and other information regarding each media content file stored in the content repository 320 that may be relevant to determining whether a media content file is or will be popular. For example, the media content statistics may include, but are not limited to, the number of views for a media content file, the time for each view, the identity of the user that uploaded the media content file to the MCP 300 or is otherwise the source of the media content file, categories for the media content file, etc.

Further, the system database 318 of the MCP 300 may also include a user profiles repository 324 that stores profile information for users over the MCP 300. Such user profile information may include, but is not limited to, user generated content, user interests, preferences, user blogs, e-mail, postings by the user on his or other users' profiles, lists of favorite video, audio, images, and other files, and demographic information about the user, such as age, gender, address, etc.

The user profile repository 324 may also store social relationships that specify associations between users of the MCP 300 and/or users of one or more external social network systems. Specified "friendships" and "group memberships" may be used to infer a similarity in user interests between users that are related in the one or more social networks.

The user profile repository 324 may also include information about activities or actions users have performed. For example, the user profile repository 324 may include a record of media content selected or "clicked on" by a user. The user profile repository 324 may also include a record of media content presented to the user and not selected thereby. For each media content file referenced in a user's profile, the user profile repository 324 may store information such as file name, upload date, categories, and other metadata. The user profile repository 324 may also include statistics regarding communications held between two or more users (e.g., the number of messages between users). In another example, the user profile repository 324 may include information regarding ratings given to media content files (e.g., "likes"), and media content files on which a user has commented on or recommended to other users.

Figure 4:
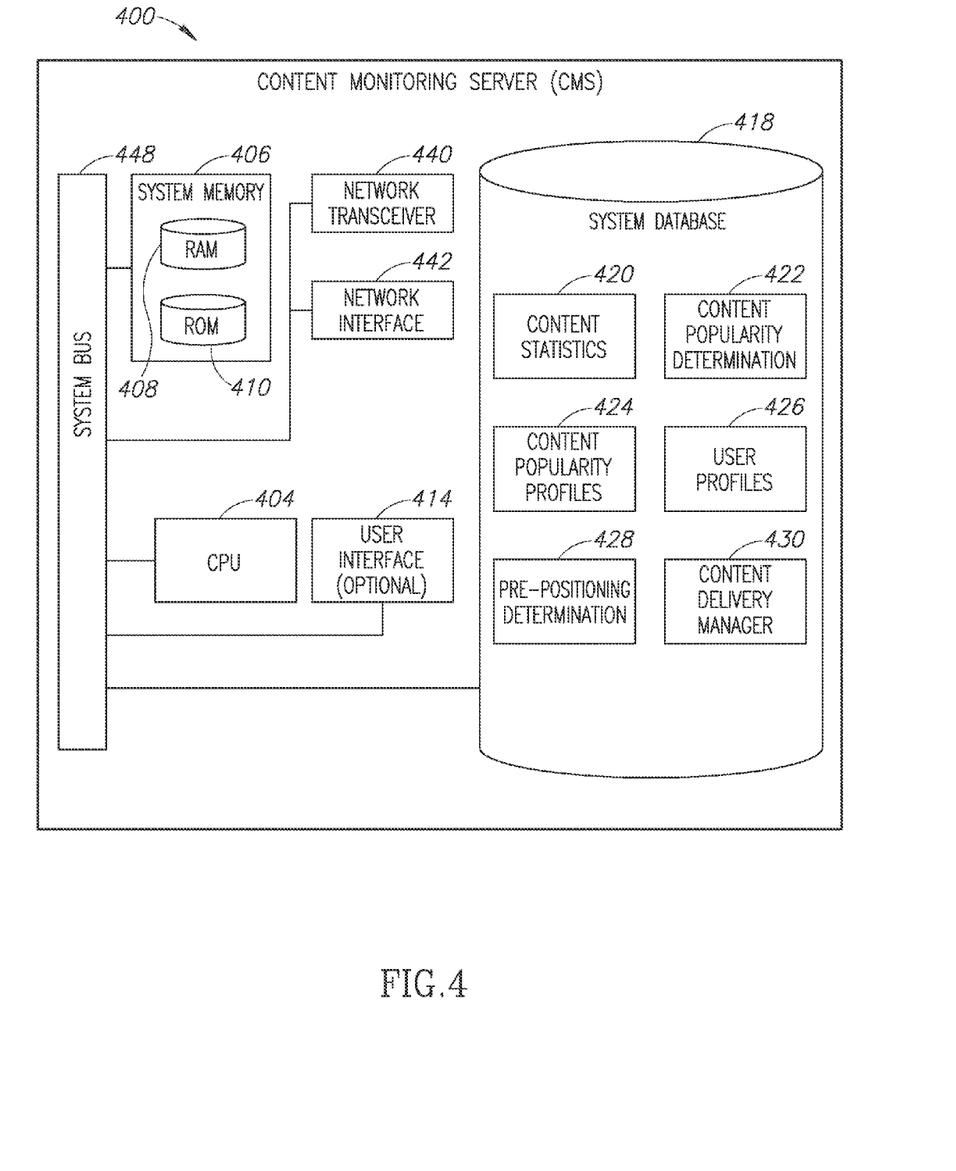
FIG. 4 illustrates a content monitoring server (CMS) according to an embodiment.

FIG. 4 shows a block diagram view of a content monitoring server (CMS) 400 that may be representative of any of the remote server devices 104A-C in FIG. 1. The CMS 400 may include, but is not limited to, one or more processor devices including a central processing unit (CPU) 404. The CPU 404 of the CMS 400 is generally responsible for executing computer programs stored on the CMS's system memory 406, which may include volatile (RAM) memory 408 and nonvolatile (ROM) memory 410. The CMS 400 may also include a user interface 414 that allows a user/administrator to interact with the CMS's software and hardware resources. The CMS 400 may also include a network transceiver 440 and network interface 442 for transmitting and receiving data content (e.g., such as media content or instructions to be delivered to a client computing device) over the data communication network 106 of FIG. 1. The CMS 400 may also include a system bus 448 that facilitates data communications amongst the hardware resources of the CMS 400.

The CMS 400 also includes a system database 418 that includes a content statistics module 420, a content popularity determination module 422, a content popularity profiles repository 424, a user profiles repository 426, a pre-positioning determination module 428, and a content delivery manager 430. Each of these components is discussed below.

The content statistics repository 420 is configured to store statistics information for media content files of the MCP 300 received from the content statistics repository 326 of the MCP. As discussed above, the media content statistics may include, but are not limited to, the total number of views for each media content file, the date/time for each view, the identity of the user that uploaded the media content file to the MCP 300 or is otherwise the source of the media content file, categories for each media content file, etc.

The content popularity determination module 422 is configured to retrieve the media content statistics for a plurality of media content files from the content statistics repository 420 and, for each media content file, to generate a content popularity profile for storage in the content popularity profiles repository 424 that represents how popular a particular media content file is or is likely to be. A goal of the content popularity determination module 422 is to determine early on in a media content file's lifecycle whether it will be popular and therefore requested by many users in the future.

Figure 6:
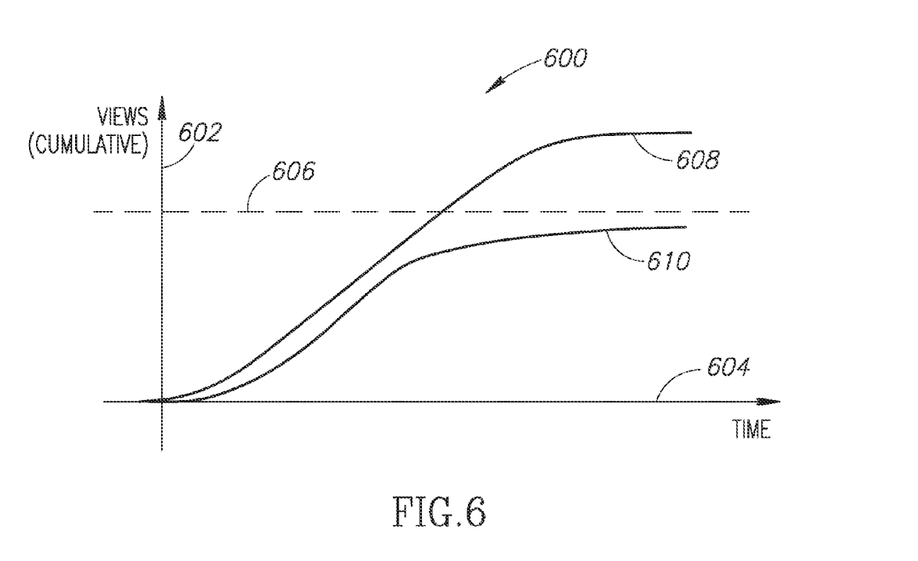
FIG. 6 illustrates a graph of the cumulative number of views of a media content file versus time used for determining when a media content file should be selected for pre-positioning.
Figure 7:
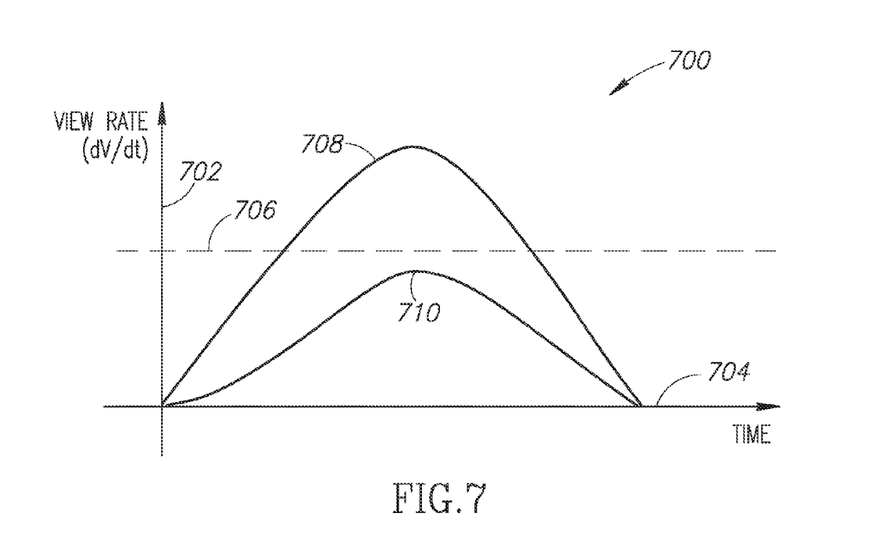
FIG. 7 illustrates a graph of the viewing rate of a media content file versus time used for determining when a media content file should be selected for pre-positioning.

The content popularity determination module 422 may utilize one or more popularity determination criteria to "predict" whether a media content file will be popular. For example, as shown in FIGS. 6 and 7 and discussed below, popularity determination criteria may include the total (i.e., cumulative) number of views for a media content file or its viewing rate, respectively. As another example, the content creator's standing in one or more social networks may be used as a measure. For example, content creators that have an "influence" on others in a social network or have a history of publishing popular content may be given more weight when determining potential popularity of media content than unknown users. Other criteria may include one or more categories associated with a particular media content file. For example, for a known popular category (e.g., professional sports), media content with 1000 views in four hours may be considered "popular," whereas for a less popular category (e.g., motorcycle maintenance), media content with 100 views in four hours may be considered popular.

The popularity status of media content files can change rapidly, depending on when and how the knowledge spreads through sharing by users. Typically, media content files are shared through media content sharing web sites, social media networks, messaging, etc. Since the popularity status of media content changes quickly, the content popularity determination module 422 may frequently update the content popularity profile for each media content file. Additionally, the content statistics repository 420 should be kept updated by frequently receiving updated content statistics information from the MCP 300.

Once the popularity of media content files has been determined, the content monitoring server (CMS) 400 then decides to which client computing devices the popular content should be pre-positioned to the PCD 200. As discussed above, pre-positioned content provides a better user experience than on-demand delivery (e.g., streaming, progressive download, etc.) since playback of pre-positioned content does not have the pauses, stuttering, and connection timeouts associated with on-demand delivery. However, because pre-positioning content requires network bandwidth, power, and storage resources, content generally should only be pre-delivered to a user when there is a reasonably high probability it will be viewed by the user.

This functionality is provided by the pre-positioning determination module 428, which evaluates the content popularity profiles 424 of the media content files and user profiles stored in the user profiles repository 426. The user profiles repository 426 may include some or all of the user profile information stored in the user profiles repository 324 of the MCP 300. The user profiles repository 426 may also include user profile information that is not present in the user profiles repository 324. In some embodiments, the CMS 400 receives user profile information from the MCP 300. In some embodiments, the CMS 400 receives user profile information from one or more social networking systems, such as YOUTUBE®, FACEBOOK®, TWITTER®, LINKEDIN®, etc.

In some embodiments, the decision as to how much content or how often content is pre-positioned to a given end user's computing device may be influenced by how frequently a user has historically watched content pre-positioned by the system. Users actively consuming pre-positioned content may receive more content than users that rarely consume pre-positioned content. These decisions may be device dependent. For example, the system may decide to pre-position certain types and amount of content to a user's smartphone and different types and amount of content to a user's tablet computer.

In some embodiments, the user may also configure settings for receiving pre-positioned content. For example, a user may desire to only receive pre-positioned content when connected to a certain type of network (e.g., Wi-Fi®). In some embodiments, the users may select a maximum amount of media content to be pre-positioned on their devices at any given time, so that users can control the storage requirements for pre-positioned content on their end user devices.

Based on the content popularity profiles for the media content files and the user profiles, the pre-positioning determination module 428 may regulate the volume of pre-positioned content sent to an end user's client computing device according to several factors. For example, the frequency at which regularly updated content, such as news stories or sports highlights, is pre-positioned may be varied (e.g., once per hour, once per day, etc.). The pre-positioning determination module 428 may also vary the volume or types of content that is pre-positioned based on the type of network attachment (e.g., 3G, 4G, Wi-Fi®, etc.) for client computing device. For example, less frequent consumers of pre-positioned content may only receive pre-positioned content through a relatively high-speed network attachment, such as Wi-Fi®.

As another example, the relative popularity of a media content file and the user's viewing history may be used to determine the volume of pre-positioned content to deliver. For instance, frequent consumers of pre-positioned content may receive the top ten most popular media content files, whereas less frequent consumers may only receive the top three most popular media content files.

The users' viewing histories, sorted by subject categories, may also be used to implement selective filters for determining whether to pre-position content. For example, if a user is known to typically consume sports-related content, the pre-positioning determination module 428 may determine not to pre-position economics-related content, or may at least determine to give the economics-related content less weight than sports-related content when making the pre-positioning determination for that particular user.

In some embodiments, the pre-positioning determination module 428 may not utilize user profiles to determine which media content files to pre-position. In these embodiments, the media content files may be pre-positioned to all users or groups of users based only on the media content files' content popularity profiles. For example, in some embodiments, all users or groups of users may receive the top ten most popular media content files as determined by the content popularity determination module 422. In these embodiments, the popularity profile for a media content file may be as simple as a binary "yes" or "no" regarding its popularity.

The content delivery manager 430 is responsible for facilitating pre-positioning of the media content files identified for pre-positioning to the client computing devices (e.g., the PCD 200 of FIG. 2). As discussed above, to avoid stressing the data communications network 106 of FIG. 1, in some embodiments the media content files are delivered using substantially only available surplus capacity of the network. In some embodiments, the content deliver manager 430 is operative to send instructions to at least one of the client application 224 of the PCD 200 and the content transfer manager 322 of the MCP 300 to download a particular media content file or group of media content files that have been identified for pre-positioning from the MCP to the PCD. In other embodiments, the content delivery manager 430 may itself retrieve the media content files from the MCP 300 and pre-position the media content files to one or more PCDs 200. Other functions may be used by the content delivery manager 430 to cause media content files to be pre-positioned to the PCD 200.

The media content files are pre-positioned to the client computing devices in a manner that is substantially transparent to the users. In some embodiments, the user may have the option of selecting preferences for receiving the pre-positioned content (e.g., type, amount, frequency, etc.), but the actual pre-positioning of the media content files occurs automatically and without intervention by the users.

In some embodiments, the content deliver manager 430 is operative to send instructions to the client application 224 of the PCD 200 to delete or "clean up" a particular media content file or group of media content files that have been previously pre-positioned on the PCD from the MCP 300. The media content files selected for deletion may be, for example, files that have already been consumed by the user, files that have been stored on the PCD 200 for an extended period of time (e.g., more than one week, etc.), files that no longer meet one or more criteria for pre-positioning, files that have been superseded by an updated file, etc.

Figure 5:
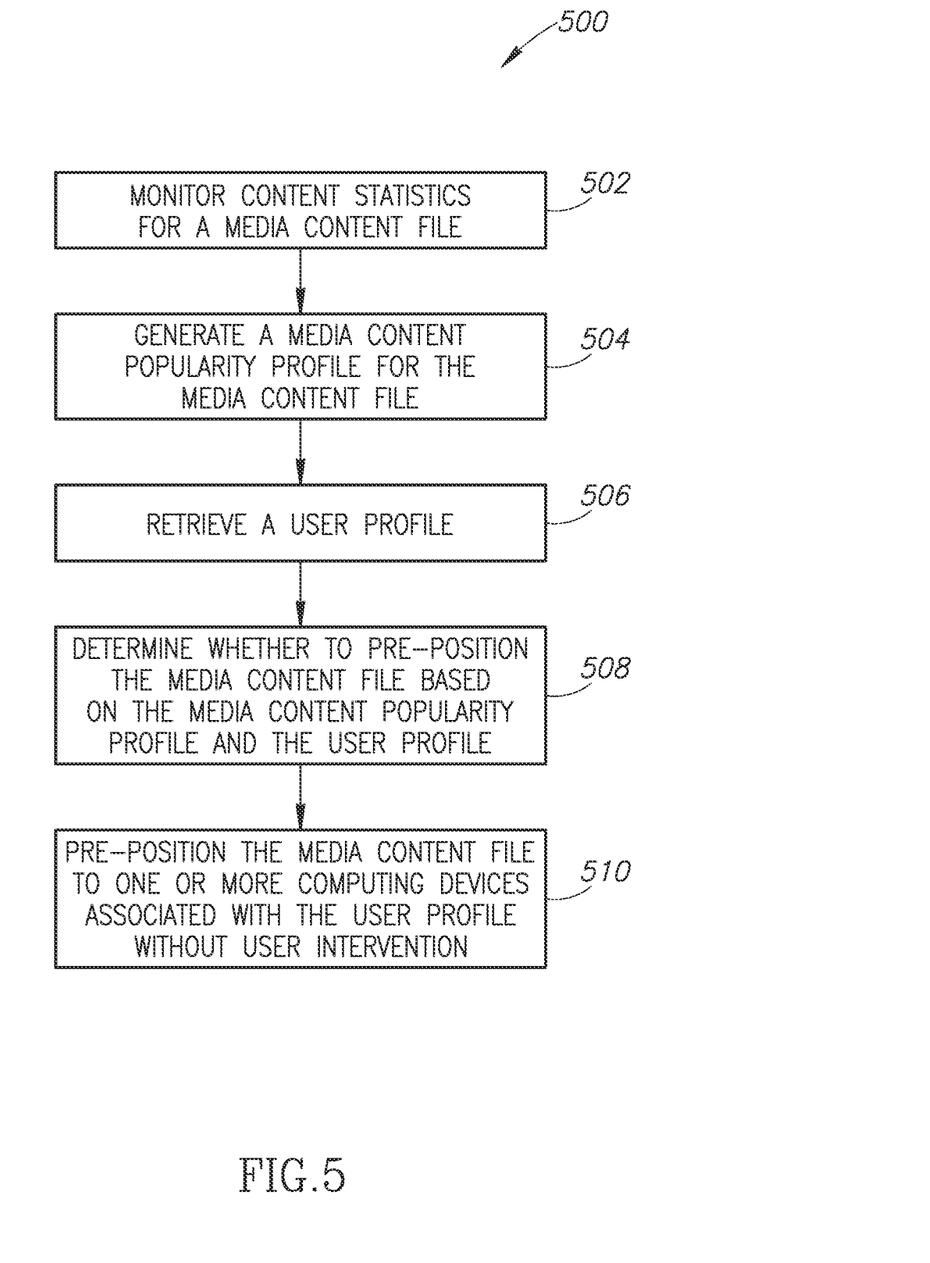
FIG. 5 illustrates a flow chart for a process of pre-positioning media content on a client computing device.

FIG. 5 illustrates a flow chart of a process 500 for pre-positioning a media content file on the PCD 200 of FIG. 2 utilizing the CMS 400 of FIG. 4 and the MCP 300 of FIG. 3. Initially, the content popularity determination module 422 monitors content statistics stored in the content statistics repository 420 for a media content file, and generates a media content popularity profile for the media content file, blocks 502 and 504. As discussed above, the content popularity profile may be frequently updated as the content statistics (e.g., view count) are updated. The pre-positioning determination module 428 may then retrieve a user's profile from the user profiles repository 426, and determine whether to pre-position the media content file based on the media content popularity profile and the user profile, blocks 506 and 508.

If the pre-positioning determination module 428 determines that a particular media content file should be pre-positioned, the content delivery manager 430 then causes the media content file to be pre-positioned to one or more client computing devices associated with the user profile without a request from the user, block 510. Thus, if the user subsequently selects or clicks on the media content file, the user will be able to view the media content file immediately (e.g., without requiring downloading or buffering) since the media content file has been pre-positioned on the user's device. Those skilled in the art will appreciate that since the pre-positioning functions discussed herein are "predictive" in nature, some media content files pre-positioned on the user's device may never be selected for consumption by the user.

FIG. 6 depicts a graph 600 illustrating a possible criterion or measure that may be used by the content popularity determination module 422 to determine whether a media content file is "popular." Typically, in the case of a popular media content file, it is initially viewed by a several initial viewers. These initial viewers then are counted and in some embodiments the users share the existence of the media content file using ratings, personal blogs, social media networks, messages, etc. For a popular or "viral" video, the view count increases very rapidly. The graph 600 of FIG. 6 depicts the number of cumulative views for a media content file on a vertical axis 602 versus time on a horizontal axis 604. A predetermined threshold level 606 is shown by a dashed horizontal line. In this embodiment, the cumulative views for a media content file are monitored (e.g., by the content popularity determination module 422). If the number of views for a media content file reaches the threshold level 606, the media content file will be pre-positioned. The graph 600 shows the cumulative views versus time for two media content files 608 and 610. As shown, the number of cumulative views for the media content file 608 exceeds the threshold 606, whereas the number of cumulative views for the media content file 610 does not exceed the threshold. Thus, in this example, the media content file 608 is selected for pre-positioning, whereas the media content file 610 is not selected for pre-positioning. As discussed above, the threshold level 606 may vary and depend on several factors, such as category, user profile information, network attachment, etc.

FIG. 7 depicts a graph 700 illustrating another possible criterion or measure that may be used by the content popularity determination module 422 to determine whether a media content file is popular. The graph 700 depicts the rate of views for a media content file on a vertical axis 702 versus time on a horizontal axis 704 (e.g., views per hour). A predetermined threshold rate 706 is shown by a dashed horizontal line. In this embodiment, the view rate for a media content file is monitored. As discussed above, the view count for a popular media content file typically increases very rapidly as users share the existence of the media content profile. This corresponds to a high view rate. In this example, if the view rate for a media content file reaches the threshold rate 706, the media content file will be pre-positioned. The graph 700 shows the view rate versus time for two media content files 708 and 710. As shown, the view rate for the media content file 708 exceeds the threshold rate 706, whereas the view rate for the media content file 710 does not exceed the threshold rate. Thus, the media content file 708 is selected for pre-positioning, whereas the media content file 710 is not selected for pre-positioning. As discussed above, the threshold rate 706 may vary and depend on several factors, such as category, user profile information, network attachment, etc.

In some embodiments, multiple criteria are used by the content popularity determination module 422 to determine whether a media content file is popular. For example, a media content file may be determined to be popular if its view rate exceeds a view rate threshold and exceeds a cumulative view count threshold. In some embodiments, thresholds for the criteria may be dependent on each other. For example, a media content file may be determined to be popular if its view rate exceeds X rate and its cumulative view count exceeds Y counts, or if its view rate exceeds 2× rate and its cumulative view count exceeds 0.5 Y counts. Other combinations of criteria may be used by the content popularity determination module 422 to identify which media content files are likely to be popular and therefore requested by several users in the future.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A networked computing system for selecting media content files for pre-positioning to a client computing device of a user over a data communications network, the networked computing system comprising:
    a content monitoring server comprising:
        a data storage structure configured to store media content statistics for a media content file associated with a media content provider coupled to the data communications network;
        a media content popularity determination module configured to analyze the media content statistics and to determine a popularity profile for the media content file, the popularity profile being indicative of the likelihood that the media content file will be subsequently requested by users; and
        a media content delivery manager configured to cause the media content file to be delivered to the client computing device via the data communications network to store the media content within the client computing device, the delivery of the media content being caused automatically and without being requested by the user of the client computing device and being based on the popularity profile for the media content file so that, if the user subsequently requests the media content file, the media content file stored within the client computing device is available for substantially immediate consumption by the user.

2. The networked computing system of claim 1 wherein the media content statistics include at least one of cumulative view count and view rate for the media content file.

3. The networked computing system of claim 1 wherein the media content statistics include cumulative view count for the media content file, and the media content popularity determination module is configured to compare the cumulative view count to a threshold view count when determining the popularity profile for the media content file.

4. The networked computing system of claim 1 wherein the media content statistics include view rate for the media content file, and the media content popularity determination module is configured to compare the view rate to a threshold view rate when determining the popularity profile for the media content file.

5. The networked computing system of claim 1 wherein the media content statistics include source information relating to the identity of the source of the media content file, and the media content popularity determination module is configured to utilize the source information when determining the popularity profile for the media content file.

6. The networked computing system of claim 1 wherein the media content file comprises a video file available from the media content provider for delivery to the client computing device over the data communications network.

7. The networked computing system of claim 1 wherein the data storage structure is further configured to store user profiles for users of the networked computing system, the networked computing system further comprising:
    a pre-positioning determination module configured to analyze a user profile of the user of the client computing device and the popularity profile of the media content file to determine whether the media content file should be stored within the client computing device of the user;
    wherein the media content delivery manager is configured to cause the media content file to be delivered to the client computing device based on the determination by the pre-positioning determination module.

8. The networked computing system of claim 7 wherein the user profile includes one or more of: the user's media content viewing history; the type of network attachment for the user's client computing device; and the user's media content viewing preferences.

9. The networked computing system of claim 7 wherein the user profiles are received in the data storage structure from one or more media content providers or social media network systems.

10. The networked computing system of claim 1 wherein the content delivery manager is configured to deliver instructions to at least one of the client computing device and the media content provider over the data communications network to download the media content file onto the client computing device from the media content provider.

11. The networked computing system of claim 1 wherein the content delivery manager is configured to download the media content file from the media content provider to the data storage structure, and to deliver the media content file to the client computing device over the data communications network.

12. The networked computing system of claim 1 wherein the content delivery manager is configured to cause the media content file to be delivered to the client computing device over the data communications network utilizing substantially only surplus network capacity.

13. A computer-implemented method comprising:
    monitoring media content statistics for a media content file associated with a media content provider coupled to a data communications network;
    analyzing the media content statistics to determine a popularity profile for the media content file, the popularity profile being indicative of the likelihood that the media content file will be subsequently requested by users; and
    causing the media content file to be delivered to a client computing device of a user via the data communications network to store the media content within the client computing device, the delivery of the media content being caused automatically and without being requested by the user and being based on the popularity profile for the media content file so that, if the user subsequently requests the media content file, the media content file stored within the client computing device being available for substantially immediate consumption by the user.

14. The computer-implemented method of claim 13 wherein the media content statistics include at least one of cumulative view count and view rate for the media content file.

15. The computer-implemented method of claim 13 wherein the media content statistics include cumulative view count for the media content file, and wherein analyzing the media content statistics comprises comparing the cumulative view count to a threshold view count when determining the popularity profile for the media content file.

16. The computer-implemented method of claim 13 wherein the media content statistics include view rate for the media content file, and wherein analyzing the media content statistics comprises comparing the view rate to a threshold view rate when determining the popularity profile for the media content file.

17. The computer-implemented method of claim 13 wherein the media content statistics include source information relating to the identity of the source of the media content file, and wherein analyzing the media content statistics comprises utilizing the source information when determining the popularity profile for the media content file.

18. The computer-implemented method of claim 13 wherein the media content file comprises a video file available from the media content provider for delivery to the client computing device over the data communications network.

19. The computer-implemented method of claim 13, further comprising:
analyzing a user profile of the user of the client computing device and the popularity profile of the media content file to determine whether the media content file should be stored within the client computing device of the user;
wherein causing the media content file to be delivered to the client computing device is based on the analysis of the user profile and the popularity profile.

20. The computer-implemented method of claim 19 wherein the user profile includes one or more of: the user's media content viewing history; the type of network attachment for the user's client computing device; and the user's media content viewing preferences.

21. The computer-implemented method of claim 19, further comprising receiving the user profile from one or more media content providers or social media network systems.

22. The computer-implemented method of claim 13 wherein causing the media content file to be delivered to the client computing device comprises delivering instructions to at least one of the client computing device and the media content provider over the data communications network to download the media content file onto the client computing device from the media content provider.

23. The computer-implemented method of claim 13 wherein causing the media content file to be delivered to the client computing device comprises downloading the media content file from the media content provider onto a data storage structure, and delivering the media content file to the client computing device over the data communications network.

24. The computer-implemented method of claim 13, wherein causing the media content file to be delivered to the client computing device comprises causing the media content file to be delivered to the client computing device over the data communications network utilizing substantially only surplus network capacity.

25. A non-transitory computer-readable medium encoded with computer executable instructions, which when executed, performs a method comprising:
monitoring media content statistics for a media content file associated with a media content provider coupled to a data communications network;
analyzing the media content statistics to determine a popularity profile for the media content file, the popularity profile being indicative of the likelihood that the media content file will be subsequently requested by users; and
causing the media content file to be delivered to a client computing device of a user via the data communications network to store the media content within the client computing device, the delivery of the media content being caused automatically and without being requested by the user and being based on the popularity profile for the media content file so that, if the user subsequently requests the media content file, the media content file stored within the client computing device being available for substantially immediate consumption by the user.

26. The non-transitory computer-readable medium of claim 25 wherein the media content statistics include at least one of cumulative view count and view rate for the media content file.

27. The non-transitory computer-readable medium of claim 25 wherein the media content statistics include cumulative view count for the media content file, and wherein analyzing the media content statistics comprises comparing the cumulative view count to a threshold view count when determining the popularity profile for the media content file.

28. The non-transitory computer-readable medium of claim 25 wherein the media content statistics include view rate for the media content file, and wherein analyzing the media content statistics comprises comparing the view rate to a threshold view rate when determining the popularity profile for the media content file.

29. The non-transitory computer-readable medium of claim 25 wherein the media content statistics include source information relating to the identity of the source of the media content file, and wherein analyzing the media content statistics comprises utilizing the source information when determining the popularity profile for the media content file.

30. The non-transitory computer-readable medium of claim 25 wherein the media content file comprises a video file available from the media content provider for delivery to the client computing device over the data communications network.

31. The non-transitory computer-readable medium of claim 25, wherein the method further comprises:
analyzing a user profile of the user of the client computing device and the popularity profile of the media content file to determine whether the media content file should be stored within the client computing device of the user;
wherein causing the media content file to be delivered to the client computing device is based on the analysis of the user profile and the popularity profile.

32. The non-transitory computer-readable medium of claim 31 wherein the user profile includes one or more of: the user's media content viewing history; the type of network attachment for the user's client computing device; and the user's media content viewing preferences.

33. The non-transitory computer-readable medium of claim 31, wherein the method further comprises receiving the user profile from one or more media content providers or social media network systems.

34. The non-transitory computer-readable medium of claim 25 wherein causing the media content file to be delivered to the client computing device comprises delivering instructions to at least one of the client computing device and the media content provider over the data communications network to download the media content file onto the client computing device from the media content provider.

35. The non-transitory computer-readable medium of claim 25 wherein causing the media content file to be delivered to the client computing device comprises downloading the media content file from the media content provider onto a data storage structure, and delivering the media content file to the client computing device over the data communications network.

36. The non-transitory computer-readable medium of claim 25, wherein the method further comprises causing the media content file to be delivered to the client computing device over the data communications network utilizing substantially only surplus network capacity.

* * * * *